(12) United States Patent
Richstein et al.

(10) Patent No.: US 8,996,978 B2
(45) Date of Patent: Mar. 31, 2015

(54) METHODS AND SYSTEMS FOR PERFORMING ANALYTICAL PROCEDURES BY INTERACTIONS WITH VISUAL REPRESENTATIONS OF DATASETS

(75) Inventors: Hans-Juergen Richstein, Rauenberg (DE); Eckhard Farrenkopf, Schriesheim (DE)

(73) Assignee: SAP SE, Walldorf (DE)

( * ) Notice: Subject to any disclaimer, the term of this patent is extended or adjusted under 35 U.S.C. 154(b) by 506 days.

(21) Appl. No.: 12/780,299

(22) Filed: May 14, 2010

(65) Prior Publication Data

US 2011/0283231 A1 Nov. 17, 2011

(51) Int. Cl.
G06F 17/00 (2006.01)
G06F 17/30 (2006.01)
G06F 3/0488 (2013.01)
G06T 11/20 (2006.01)

(52) U.S. Cl.
CPC ........ *G06F 17/30392* (2013.01); *G06F 3/0488* (2013.01); *G06T 11/206* (2013.01); *G06F 2203/04808* (2013.01)
USPC .......................................... 715/215; 715/212

(58) Field of Classification Search
CPC ......... G06F 17/246; G06F 7/16; G06F 17/18; G06F 3/0486; G06T 11/206; G06T 2200/24; G06T 5/40
USPC .................................................. 715/212, 215
See application file for complete search history.

(56) References Cited

U.S. PATENT DOCUMENTS

| | | | |
|---|---|---|---|
| 5,535,324 A * | 7/1996 | Alvarez et al. ................ 715/209 |
| 6,112,214 A | 8/2000 | Graham et al. | |
| 6,169,985 B1 * | 1/2001 | Almgren et al. ...................... 1/1 |
| 6,693,651 B2 * | 2/2004 | Biebesheimer et al. ...... 715/837 |
| 6,711,577 B1 * | 3/2004 | Wong et al. .................... 707/694 |
| 7,089,506 B2 * | 8/2006 | Gantenhammer et al. .... 715/850 |
| 7,191,410 B1 | 3/2007 | Kruempelmann et al. | |
| 7,660,900 B2 | 2/2010 | Sattler et al. | |
| 7,693,948 B2 | 4/2010 | Heix et al. | |
| 7,707,506 B2 | 4/2010 | Weigel et al. | |
| 8,407,610 B2 * | 3/2013 | Gilboa et al. ................. 715/762 |
| 8,812,947 B1 * | 8/2014 | Maoz et al. ................... 715/212 |
| 2004/0267477 A1 * | 12/2004 | Scott et al. .................... 702/108 |
| 2006/0095372 A1 | 5/2006 | Venkatasubramanian et al. | |

(Continued)

OTHER PUBLICATIONS

Extended European Search Report issued in European Application No. 11003718.1 on Aug. 19, 2011; 7 pages.

(Continued)

*Primary Examiner* — Shen Shiau
(74) *Attorney, Agent, or Firm* — Fish & Richardson P.C.

(57) ABSTRACT

This disclosure provides examples of computerized methods and software for performing analytical procedures by interacting with visual representations of datasets. In one aspect, a visualization of a first dataset is displayed in a first portion of a GUI, where that visualization is associated with a set of criteria applied to the first dataset. A visualization of a second dataset is displayed in a second portion of the GUI. A selection of at least a portion of the data from the visualization of the first dataset is received, the selection associated with at least one set of set of criteria from the first dataset. A request to apply the selection to the second dataset is received, and, based thereon, the set of criteria from the first dataset is applied to the second dataset to generate a third dataset. A visual representation of the third dataset is then displayed in the GUI.

17 Claims, 13 Drawing Sheets

(56) References Cited

U.S. PATENT DOCUMENTS

| | | |
|---|---|---|
| 2006/0095373 A1 | 5/2006 | Venkatasubramanian et al. |
| 2006/0106509 A1* | 5/2006 | Robb et al. ............ 701/29 |
| 2006/0294056 A1* | 12/2006 | Cornpropst et al. ......... 707/2 |
| 2007/0094609 A1* | 4/2007 | Gilboa et al. ............ 715/762 |
| 2007/0136676 A1 | 6/2007 | Kruempelmann et al. |
| 2008/0015919 A1 | 1/2008 | Busse et al. |
| 2008/0062176 A1 | 3/2008 | Arya |
| 2008/0140785 A1 | 6/2008 | Farrenkopf et al. |
| 2008/0155105 A1 | 6/2008 | Sattler et al. |
| 2008/0163091 A1* | 7/2008 | Busse ............ 715/771 |
| 2009/0199130 A1* | 8/2009 | Tsern et al. ............ 715/810 |

OTHER PUBLICATIONS

"Multi-touch," *Wikipedia*, [online], <http://en.wikipedia.org/w/index-php?title=Multi-touch&printable=yes>, retrieved May 3, 2010, 5 pages.

"iPad," *Wikipedia*, [online], <http://en.wikipedia.org/w/index-php?title=iPad&printable=yes>, retrieved May 3, 2010, 15 pages.

\* cited by examiner

| BU MOBILE | | PRODUCT CATEGORY A | | | PRODUCT CATEGORY B | | | PRODUCT CATEGORY C | | |
|---|---|---|---|---|---|---|---|---|---|---|
| | | PA1 | PA2 | PA3 | PB1 | PB2 | PB3 | PC1 | PC2 | PC3 |
| REGION US | 2009 | 10 | 20 | 30 | 40 | 50 | 60 | 70 | 80 | 90 |
| | 2010 | 20 | 30 | 40 | 50 | 60 | 70 | 80 | 90 | 100 |
| REGION EMEA | 2009 | 5 | 10 | 15 | 20 | 25 | 30 | 35 | 40 | 45 |
| | 2010 | 7 | 14 | 21 | 28 | 35 | 42 | 49 | 56 | 63 |
| REGION APA | 2009 | 2 | 4 | 6 | 8 | 10 | 12 | 14 | 16 | 18 |
| | 2010 | 20 | 40 | 60 | 80 | 100 | 120 | 140 | 160 | 180 |

| OVERDUE SALES ORDERS BU MOBILE | |
|---|---|
| 2009 | 30 |
| 2010 | 40 |

FIG. 7B

METHODS AND SYSTEMS FOR PERFORMING ANALYTICAL PROCEDURES BY INTERACTIONS WITH VISUAL REPRESENTATIONS OF DATASETS

TECHNICAL FIELD

The present disclosure relates to methods, software, and devices for performing analytical procedures, and, more specifically, to methods, software, and devices for applying analytical filters through interactions with objects representing datasets.

BACKGROUND

Analytical applications generally show content, such as business information including sales, inventory, and other relevant data, as charts and/or tables representing underlying datasets. In some instances, subsets of a large, underlying set of data can be generated such that specific characteristics or filtered criteria of a larger dataset are represented instead. Within an analytical application, the charts and tables used to express various types or sets of data can be multiple in type, form, and criteria, based on user requests, predetermined sets of information generally known to be useful to a set of users, and sets of related data. Further, different types of charts and graphs may be used, including spreadsheets, pie charts, line graphs, bar charts, and any other suitable means for illustrating datasets or defined subsets thereof.

Touch screen and multi-touch devices provide methods for entering information through the use of a pointer, finger, or other touch-based device or tool, as well as through previous tools, such as a standard mouse or hardware-based keyboard. Multi-touch devices, specifically, provide users with the ability to apply multiple finger gestures simultaneously onto a visual display, such as a graphical user interface on a touch screen, to send complex commands to the device. The use of touch inputs with analytical data provides immersive, interactive, and intuitive methods and procedures for selecting, manipulating, and viewing information.

SUMMARY

This disclosure provides examples of computerized methods and software for performing analytical procedures by interacting with visual representations of datasets. In one aspect, a visualization of a first dataset is displayed in a first portion of a GUI, where that visualization is associated with a set of criteria applied to the first dataset. A visualization of a second dataset is displayed in a second portion of the GUI. A selection of at least a portion of the data from the visualization of the first dataset is received, the selection associated with at least one set of set of criteria from the first dataset. A request to apply the selection to the second dataset is received, and, based thereon, the set of criteria from the first dataset is applied to the second dataset to generate a third dataset. A visual representation of the third dataset is then displayed in the GUI.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 7A and 7B are examples of the application of a complete first dataset onto a second dataset as described by the method of FIG. 3.

DETAILED DESCRIPTION

Figure 1:
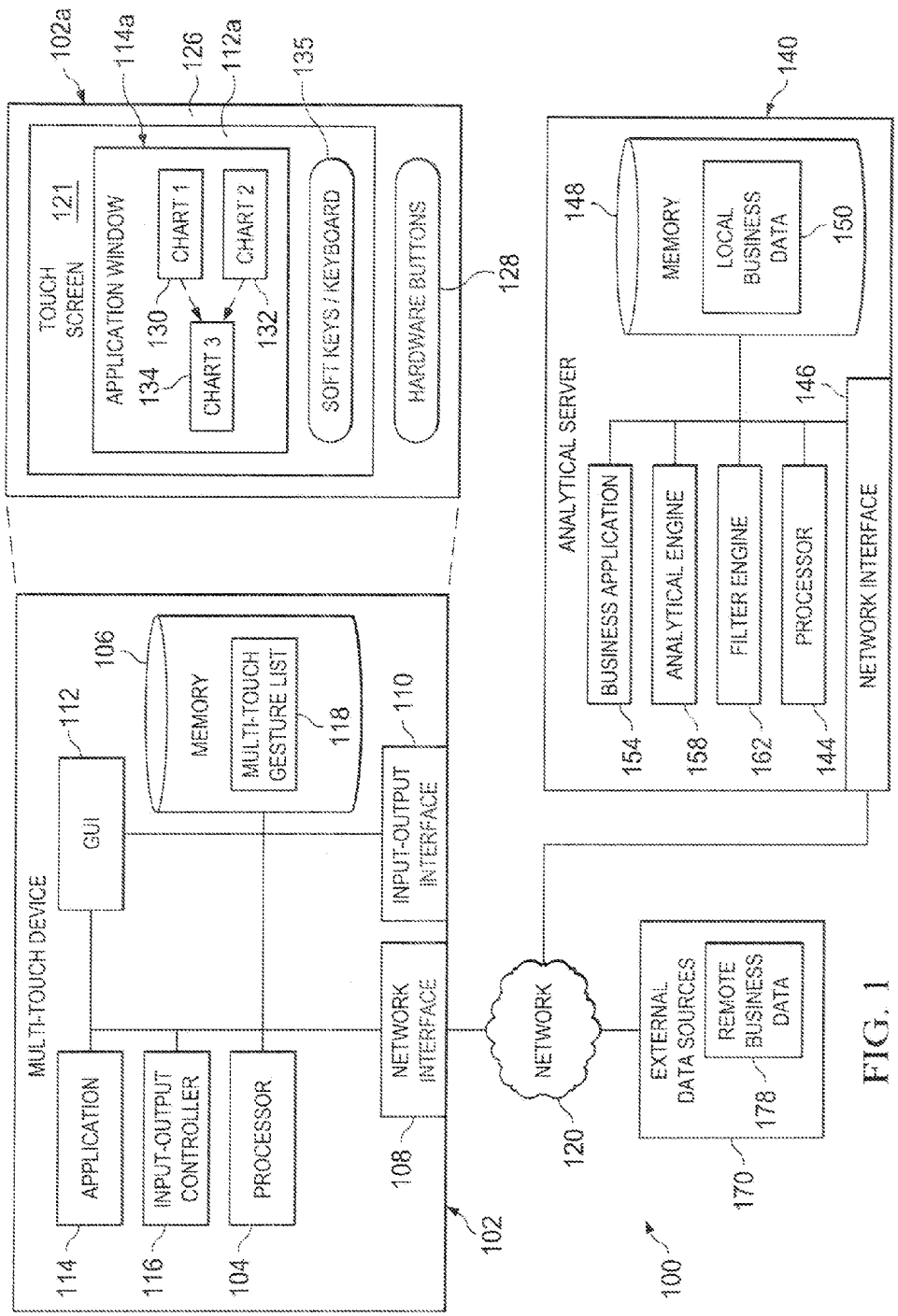
FIG. 1 illustrates an example system for displaying, viewing, and manipulating analytical datasets, including through the use of a touch or multi-touch enabled device in accordance with one embodiment of the present disclosure.

This disclosure generally describes methods, devices, and systems for visualizing sets of analytical (or other data) and, through procedures and methods of interacting with those visualizations (or graphical objects representing a particular dataset), creating new visual representations of data based on those interactions. In general, a dataset is the result of a data extraction from a system containing information, through the generation of an analytical report, or, more generally, the results of a database query. Datasets can be represented in a number of ways, including a graphical visualization of the dataset (e.g., a chart, graph, or other illustration of the data) or in a table-based display. These visual representations can represent an entire dataset, or in some cases, a portion of the dataset filtered by categories, types, or organizations of the information. Visualizations of portions of the underlying dataset can be used to provide more structured, meaningful, and detailed data, particularly for users interested in the information from a certain point of view or for a certain task. For example, an entire set of sales information for a company can be processed to show only certain or specific criteria, such as visualizations of sales for a specific region, a specific store, a subset of offered products, as well as any other discrete method of splitting or classifying the overall dataset. In many instances, subsets of the overall dataset may be considered to be filtered subsets of the overall dataset.

Within a particular visual representation of a dataset, users can select an entire dataset (such as a whole chart, graph, or table) or a subset of the data (such as individual bars of a bar chart, pieces of a pie chart, rows or cells within a table, as well as other discrete portions or combinations of the dataset). These selections thus represent a subset of one or more criteria for the selected portion of the dataset. For example, in a sales order bar graph, illustrating sales (combination of actual, projected, and targets) on the y-axis, and dates (by month) on the x-axis, the selection of three vertical bars in the bar graph can represent the sales for a three-month period. Therefore, the criteria associated with the selected subset represents the sales information for those three months. Similarly, in a table illustrating total sales value for several regions (i.e., Europe, United States, and Asia), with the values also delineated by years (i.e., 2009 sales and 2010 sales), the selection of a line associated with US sales in 2009 represents the selected criteria of total sales in the US region in 2009 from the table. In other words, each selection of a subset of data from the dataset's visual representation contains a semantic meaning with regard to the underlying data. These semantics, through the use of the visual representation of the subset, can then be applied to other datasets, in turn applying similar filters or criteria to other related datasets. By doing so, additional criteria and refinements can be applied to related datasets, allowing users to quickly and easily manipulate data to conform or relate to the criteria defined in the original visual representation. Still further, through the use of touch-based and multi-touch systems, the visual representations of various datasets can be manipulated in an interactive manner to provide users with high levels of usability and semantic understanding as real-time selections and modifications are made to one or more visual representations of datasets.

FIG. 1 illustrates an example environment 100 where various methods for analytical procedures provided by interacting with visual representations of datasets (and subsets thereof) may be performed. As illustrated in FIG. 1, environment 100 includes a multi-touch device 102, a network 120, an analytical server 140, and one or more external data sources 170. In some instances, the multi-touch device 102 and the analytical server 140 may be combined as a single component in environment 100, while in other instances, one or more of the illustrated parts of FIG. 1 may be separated into two or more additional components. In general, the multi-touch device 102 and the analytical server 140 can communicate across network 120, where applicable. In general, environment 100 depicts an example configuration of a system operable to visualize and manipulate various datasets of analytical data, business data, and/or any other suitable type of data.

In general, the multi-touch device 102 can comprise any computer or other processing device that executes or displays information associated with one or more applications (such as an internal application 114 or an external business application 154), and that receives and processes input from touch-based gestures or other inputs, such as those from hardware-based inputs (i.e., a mouse or keyboard). In some instances, the multi-touch device 102 is capable of receiving touch input based on multiple finger gestures simultaneously applied onto a touch screen 121 of the device 102. Different types of multi-touch devices 102 may be used in accordance with the present disclosure. For example, different sized multi-touch devices 102 may be used, as well as multi-touch devices 102 where the touch screen 121 is in a separate housing or structure than the processing portions of the device 102. Further, in alternative implementations, the multi-touch device 102 may only accept and/or recognize input from non-touch-based input devices, such as a traditional mouse and keyboard configuration. In the current environment 100, the multi-touch device 102 is considered to be located in a single housing enclosing both the touch screen 121 and the various internal processors, memory, and other components of the multi-touch device 102. In some instances, the touch screen 121 may be a liquid crystal display (LCD). Further, the touch screen 121 may recognize touch-based inputs based on electrical conductivity, relative pressure from a touch-based input, the use of light-sensitive sensors to determine contact(s) with the touch screen 121, as well as any other suitable touch input mechanism or combination thereof. Some examples of multi-touch devices 102 include Apple's iPhone smartphone and iPad tablet device, Google's Nexus One smartphone, HTC's Hero, Legend, and Desire smartphones, Microsoft's Zune HD media device, Palm's Pre smartphone, and Motorola's Droid smartphone, as well as numerous other consumer and/or business-related devices and accessories capable of receiving and processing multi-touch inputs.

In the implementation illustrated in FIG. 1, the multi-touch device 102 includes a processor 104, a memory 106, a network interface 108, an input-output interface 110, an input-output controller 116, an application 114, and a graphical user interface (GUI) 112. The network interface 108 is used by the multi-touch device 102 for communicating with other systems, computers, or devices within or external to environment 100, such as through the multi-touch device's 102 connection to the network 120. Generally, the network interface 108 comprises logic encoded in software and/or hardware in a suitable combination and operable to communicate with the network 120. More specifically, the network interface 108 may comprise software supporting one or more communication protocols associated with communications such that the network 120 or hardware is operable to communicate physical signals within and outside the illustrated environment 100.

Generally, the network 120 facilitates wireless or wireline communications between the components of the environment 100 (i.e., between the multi-touch device 102 and the analytical server 140, between the analytical server 140 and the plurality of external data sources 170), as well as with any other local or remote computer, such as additional clients, servers, or other devices communicably coupled to network 120 but not illustrated in FIG. 1. The network 120 is illustrated as a single network in FIG. 1, but may be a continuous or discontinuous network without departing from the scope of this disclosure, so long as at least a portion of the network 120 may facilitate communications between senders and recipients. The network 120 may be all or a portion of an enterprise or secured network, while in another instance, at least a portion of the network 120 may represent a connection to the Internet. In some instances, a portion of the network 120 may be a virtual private network (VPN), such as, for example, the connection between the multi-touch device 102 and the analytical server 140. Further, all or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the multi-touch device 102 includes a processor 104. Although illustrated as a single processor 104 in FIG. 1, two or more processors may be used according to particular needs, desires, or particular embodiments of environment 100. Each processor 104 may be a central processing unit (CPU), a blade, an application specific integrated circuit (ASIC), a field-programmable gate array (FPGA), or another suitable component, including processors specifically designed for mobile and/or multi-touch devices. Generally, the processor 104 executes instructions and manipulates data to perform the operations of multi-touch device 102, often using software. Specifically, the multi-touch device's processor 104 executes the functionality required to execute the illustrated application 114, interact with the business application 154 (at analytical server 140), interpret inputs to the multi-touch device 102, including touch and multi-touch gestures received via the touch screen 121 (recognized and decoded by the input-output interface 110) using the input/output controller 116, as well as any other software functionality performed or available on the multi-touch device 102. Regardless of the particular implementation, "software" may include computer-readable instructions, firmware, wired or programmed hardware, or any combination thereof on a tangible medium, as appropriate. Indeed, each software component may be fully or partially written or described in any appropriate computer language including C, C++, Java, Visual Basic, assembler, Perl, any suitable version of 4GL, as well as others, including languages and operating systems designed specifically for mobile and/or multi-touch devices. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate.

As described, the processor 104 executes one or more applications 114, as well as the operations associated with the input-output controller 116. The application 114 may be any appropriate software, including, but not limited to, a web browser, a locally-executed business application, a general utility for the device 102, word processing software, business utility software, or any other software suitable for use on the multi-touch device 102. Further, the application 114 may represent software associated with and/or working in conjunction with the business application 154, at least a portion of which is executed remotely from the multi-touch device 102. In some instances, the application 114 may be a web browser operable to execute a web-based version of the business application 154 through hypertext transfer protocol (HTTP) requests and responses sent between the multi-touch device 102 and the analytical server 140.

The input-output controller 116 may comprise software capable of interpreting one or more touch and/or multi-touch gestures received and identified by the input-output interface 110, where the input-output interface 110 is associated with the touch screen 121 of the device 102. When specific touch inputs, such as touch- or multi-touch-based gestures, are received at the touch screen 121 and recognized or identified by the input-output interface 110, those touch inputs are interpreted by the input-output controller 116 to determine their meaning and function within a particular executing application 114 or for use with an underlying operating system or functionality included with the multi-touch device 102. For instance, a pinching gesture, performed by simultaneously contacting the touch screen 121 with two fingers and bringing them towards each other, may have different meanings and functionality in different instances and applications. In one instance, the pinch may cause a zoom (for instance, in a map or web browsing application), while in other instances, the pinch may change the granularity of a set of values presented on the screen. Alternatively, the pinch gesture may have a universal meaning independent of any particular application, such that a received and identified pinch gesture causes the some response by the input-output controller 116 in any instance. As illustrated, the input-output controller 116 can access a list, table, database, or any other set of information defining the set of recognized touch and multi-touch gestures, illustrated in FIG. 1 as the multi-touch gesture list 118 (and stored in memory 106). The multi-touch gesture list 118 may comprise a list of cross-referencing information used by the input-output controller 116 to determine the context-specific meaning of a particular gesture received and relayed by the input-output interface 110 to the input-output controller 116. In some instances, an application 114 or other running software may include instructions that supersede the gesture meanings stored in the multi-touch gesture list 118, and which are used during the runtime of that particular application 114 or software. Additionally, the multi-touch gesture list 118 may define a plurality of multi-touch and touch gestures defined by a touch-based or touch-related operating system, such that the various gestures provide building blocks upon which complicated and additional signals and commands can be based. By combining one or more gestures, or assigning gestures to a specific task, various commands and actions can be generated by software and user interface developers.

Memory 106 within the multi-touch device 102 may include any memory or database module and may take the form of volatile or non-volatile memory including, without limitation, magnetic media, optical media, random access memory (RAM), read-only memory (ROM), removable media, or any other suitable local or remote memory component. Memory 106 may store various objects or data, including classes, frameworks, applications, backup data, business objects, jobs, web pages, web page templates, multi-touch gesture lists 118 (as illustrated), database tables, repositories storing business or other dynamic information, or any other information including any parameters, variables, algorithms, instructions, rules, constraints, or references thereto relevant to the purposes or operations of the multi-touch device 102. Additionally, memory 106 may include any other appropriate data, such as VPN applications, firmware logs and policies, firewall policies, a security or access log, print or other reporting files, as well as others. In some instances, memory 106 may store various types of analytical data and information for use in presenting and manipulating data as described in the present disclosure.

The multi-touch device 102 further includes a graphical user interface (GUI) 112. In general, the GUI 112 comprises a graphical user interface operable to allow the user to interact with at least a portion of environment 100 for any suitable purpose, including generating or presenting a visual representation of the one or more web pages, documents, applications 114, or any other suitable visual representation of data on the device 102, as well as, through the use of the touch screen 121, provide or submit touch-based input to the multi-touch device 102 and any of the software or processes executing on or through the device 102. Generally, the GUI 112 provides users with an efficient and user-friendly presentation of data provided by or communicated within the system. The term "graphical user interface," or GUI, may be used in the singular or in the plural to describe one or more graphical user interfaces and each of the displays of a particular graphical user interface. Therefore, the GUI 112 can be any graphical user interface, such as a web browser, touch screen, or command line interface (CLI) that processes information in the environment 100 and efficiently presents the results to the user. In general, the GUI 112 may include a plurality of user interface (UI) elements such as interactive fields, pull-down lists, and buttons operable by a user of the multi-touch device 102. These UI elements may be related to the functions of the illustrated local application 114 executing at the device 102, as well as a remotely executed (at least in part) business application 154, as well as the general functionality associated with the operating system or software environment executing on the device 102. In particular, the GUI 112 may be used in connection with a web browser, allowing users and the device 102 to view and navigate to various web pages and/or web-based applications, some of which may be associated with (or provide a visual representation of) applications executed remotely from the multi-touch device 102, such as business application 154.

In some instances, the GUI 112 is a software application that enables the multi-touch device 102 (or a user thereof) to display and interact with text, images, videos, music and other information associated with local applications 114 and/or business applications 154 located remote from the device 102, with the business applications 154 sending a visual representation of data or functionality to the multi-touch device 102 via network 120. Additionally, other web-based applications (not shown in FIG. 1) can be accessed and interacted with via the GUI 112. In some instances, at least a portion of the GUI 112 may present information associated with a web browser, and can format web pages stored as HTML documents, XHTML documents, text files, or any other suitable files for display via the GUI 112. The visual appearance of a particular web page may differ between different web browsers, based on the web browser's particular method of displaying information, as well as based on settings defined by or for the multi-touch device (or for a specific user thereof). Example web browsers may include Microsoft's Internet Explorer, Mozilla's Firefox, Apple's Safari, Opera Software ASA's Opera browser, and Google's Chrome, as well as any other suitable browser, including browsers designed specifically for mobile or portable devices, as well as for touch-based or multi-touch devices. In certain implementations, the web browser may be associated with, or may be a portion or module of, a business application 154, such as web-based application, that provides and displays data and functionality associated with the application through web-based processing and on-device visualization of the same.

FIG. 1 further illustrates an example of the external design of the multi-touch device 102a. As illustrated, the multi-touch device 102a includes a case 126, a touch screen 121 for displaying information and through which touch input is entered (described above), a set of permanent hardware buttons 128, a set of soft keys or a software-based keyboard 135, an application window 114a displaying at least a portion of an executing application 114 (or remotely executing business application 154), and a set of dataset visualizations 130, 132, 134. The case 126 may comprise any materials or structure housing the various portions of the multi-touch device 102a. Additionally, the case 126 may provide a functional or ornamental bezel surrounding the touch screen 121 and hardware buttons 128. The hardware buttons 128 may be any buttons included with the multi-touch device 102a, including a power button, a volume button, a physical keyboard, a back button, a home button, or any other physical button or key used in the operation of the device 102a. The application window 114a comprises at least a portion of the GUI 112a used to display visual output and/or information associated with a particular executing operation or application. It will be understood that in some implementations, multiple instances of application windows 114a associated with the same or different applications or operations may be presented simultaneously on the GUI 112a. For instance, a first application window 114a may be associated with an instance of the local application 114, while a second application window 114a may be associated with an instance of the remote business application 154. Additionally, the multi-touch device 102a may allow for application windows 114a to be tiled, stacked, hidden, or otherwise moved and manipulated, for example, through specific touch and/or multi-touch gestures, as well as through manipulation of the hardware buttons 128 or soft keys (or software-based keyboard) 135.

Charts 1 (130), 2 (132) and 3 (134) comprise visual representations of one or more underlying datasets. In general, each chart provides a visualization of a dataset with one or more criteria or filters applied to the underlying dataset, generally limiting the amount and type of information presented by the individual charts. In some instances, such as illustrated in FIG. 1, charts (here, chart 1 (130) and chart 2 (132) may include similar or related information, such that a combination, or merging of the two charts, can create a dataset represented by chart 3 (134), which combines at least a portion of the information presented in chart 1 (130) and chart 2 (132) to present a third chart 3 (134). The data represented by these charts may be retrieved from any suitable dataset, and in some instances, may include overlapping portions of, or different criteria applied to, the same dataset. By using touch and multi-touch gestures on the GUI 112a, users can select all or a portion of each chart to apply or combine with one or more other charts. Example methods and figures illustrating types of combinations and filtering are provided in further detail in FIGS. 2-9.

Returning to the mobile device 102a, a set of soft keys and/or a software-based keyboard 135 may also be presented on the GUI 112a. These software-based inputs allow for application- and/or operation-specific buttons and inputs to be presented in a particular application or operation context. For instance, an interactive form may include a "finish" button that is only provided when the application is in process or is completed. Additionally, a software-based keyboard 135 may be used by devices 102 that do not include a physical keyboard, thus allowing for smaller devices 102 and larger displays and touch screens 121. The soft keys and software-based keyboard 135 can be located in a particular position on the GUI 112a, or may be moveable around the GUI 112a through touch gestures or as directed by a particular application or operation. Furthermore, some applications and software may have buttons embedded or included within the application window 114a, which can be activated through a touch gesture in the appropriate location on the touch screen 121. In one example, a software-based keyboard 135 may be hidden during web browsing until a text box or other text-based input is needed or requested.

Returning to the block diagram of the environment 100 in FIG. 1, the network 120 can allow the multi-touch device 102 to communicate with the analytical server 140 and at least a portion of the functionality provided by the analytical server's business application 154, analytical engine 158, and filter engine 162. At a high level, the analytical server 140 comprises an electronic computing device operable to receive, transmit, process, store, or manage data and information associated with the environment 100. In general, analytical server 140 may be any computer or processing device such as, for example, a blade server, general-purpose personal computer (PC), Macintosh, workstation, Unix-based computer, or any other suitable device. In other words, the present disclosure contemplates computers other than general purpose computers, as well as computers without conventional operating systems. Illustrated analytical server 140 may be adapted to execute any operating system including Linux, UNIX, Windows Server, or any other suitable operating system. In some instances, such as that illustrated in FIG. 1, the analytical server 140 hosts or executes a business application 154 which can then be viewed or interacted with at the multi-touch device 102 via the multi-touch device's GUI 112. Input and interactions at the multi-touch device 102 can be interpreted and relayed to the business application 154 in accordance with the application's 154 functionality. The business application 154 can be any suitable application, including web- or cloud-based portions of a business application, such as an enterprise resource planning (ERP) system. In some instances, the business application 154 may be a module or portion of a larger, enterprise and/or distributed application. For example, the business application 154 illustrated in FIG. 1 may be a portion of a larger application, the business application 154 providing functionality for retrieving, organizing, manipulating, and visualizing data associated with the underlying enterprise application.

As illustrated, the business application 154 may be associated with an analytical engine 158 that allows the business application 154 to perform advanced operations on various sets of data. For instance, the analytical engine 158 may be used to generate one or more reports, execute database queries, or perform other information retrieval operations as appropriate for the business application 154. Information gathered or generated by the analytical engine 158 may be passed to the business application 154, or sent directly to one or more external devices, such as the illustrated multi-touch device 102. Still further, the analytical server 140 may also include a filter engine 162 used to apply (or add) various types and levels of filtering criteria for the analytical engine 158 when retrieving information. In some instances, the filter engine 162 may receive or process input received from the multi-touch device 102 to determine the filtering criteria associated with analytical data returned by the analytical engine 158 (and the associated business application 154). For instance, selections made by a user to portions of a chart provided in an application window 114a can be sent to the filter engine 162, and, upon receiving the appropriate instructions from the user (e.g., by dragging a selected set of information from chart 1 (130) onto chart 2 (132), apply the filtering criteria to a dataset. In some instances, one or both of the analytical engine 158 and the filter engine 162 may be included with or a part of the business application 154. Alternatively, the filter engine 162 may be included within or a part of the analytical engine 158, allowing for various filters to be applied when datasets are retrieved, generated, and/or presented.

As illustrated in FIG. 1, the analytical server 140 includes a network interface 146, a processor 144, and a memory 148. The network interface 146 may be similar to the network interface 108 of the multi-touch device 102, and as such, may allow the analytical server 140 to communicate with the multi-touch device 102, as well as any other device, server, or other component communicably coupled to the network 120. The processor 144 may comprise more than one processor, and may be a CPU, a blade, an application specific integrated circuit (ASIC), a field-programmable gate array (FPGA), or another suitable component. Generally, the processor 144 executes instructions and manipulates data to perform the operations of the analytical server 140, often using software, and may execute the business application 154, the analytical engine 158, and the filter engine 162.

Similar to memory 106 of the multi-touch device 102, memory 148 may include any memory or database module and may take the form of volatile or non-volatile memory including, without limitation, magnetic media, optical media, random access memory (RAM), read-only memory (ROM), removable media, or any other suitable local or remote memory component. Memory 148 may store various objects or data, including business data, database tables, repositories storing business information, classes, frameworks, applications, backup data, business objects, jobs, web pages, web page templates, or any other information including any parameters, variables, algorithms, instructions, rules, constraints, or references thereto. Additionally, memory 148 may include any other appropriate data, such as VPN applications, firmware logs and policies, firewall policies, a security or access log, print or other reporting files, as well as others. In some instances, memory 148 may store various types of analytical data and information for use in presenting and manipulating data as described in the present disclosure, such as local business data 150. The local business data 150 may in some instances include portions of the data associated with the business application 154, such as information on a particular business (e.g., sales, revenues, inventory, etc.), as well as any datasets relevant. In some instances, however, the entire set of business data 150 for a particular business or business application 154 may be distributed across a plurality of locations. As illustrated in FIG. 1, one or more external data sources 170 (e.g., external servers, data repositories, or other devices or components storing or associated with additional data and/or datasets) may also be available, and can be accessed by the business application 154 and the analytical engine 158 in order to read, view, and manipulate additional and remote business data 178. Still further, the business application 154 may use data stored at the multi-touch device 102, as well as any other device or location associated with network 120 to which the business application 154 has rights and can access said data.

While FIG. 1 is described as containing or being associated with a plurality of components, not all components illustrated within the illustrated implementation of FIG. 1 may be utilized in each alternative implementation of the present disclosure. Additionally, one or more of the components described herein may be located external to environment 100, while in other instances, certain components may be included within or as a portion of one or more of the other described components, as well as other components not described. Further, certain components illustrated in FIG. 1 may be combined with other components, as well as used for alternative or additional purposes, in addition to those purposes described herein.

Figure 2:
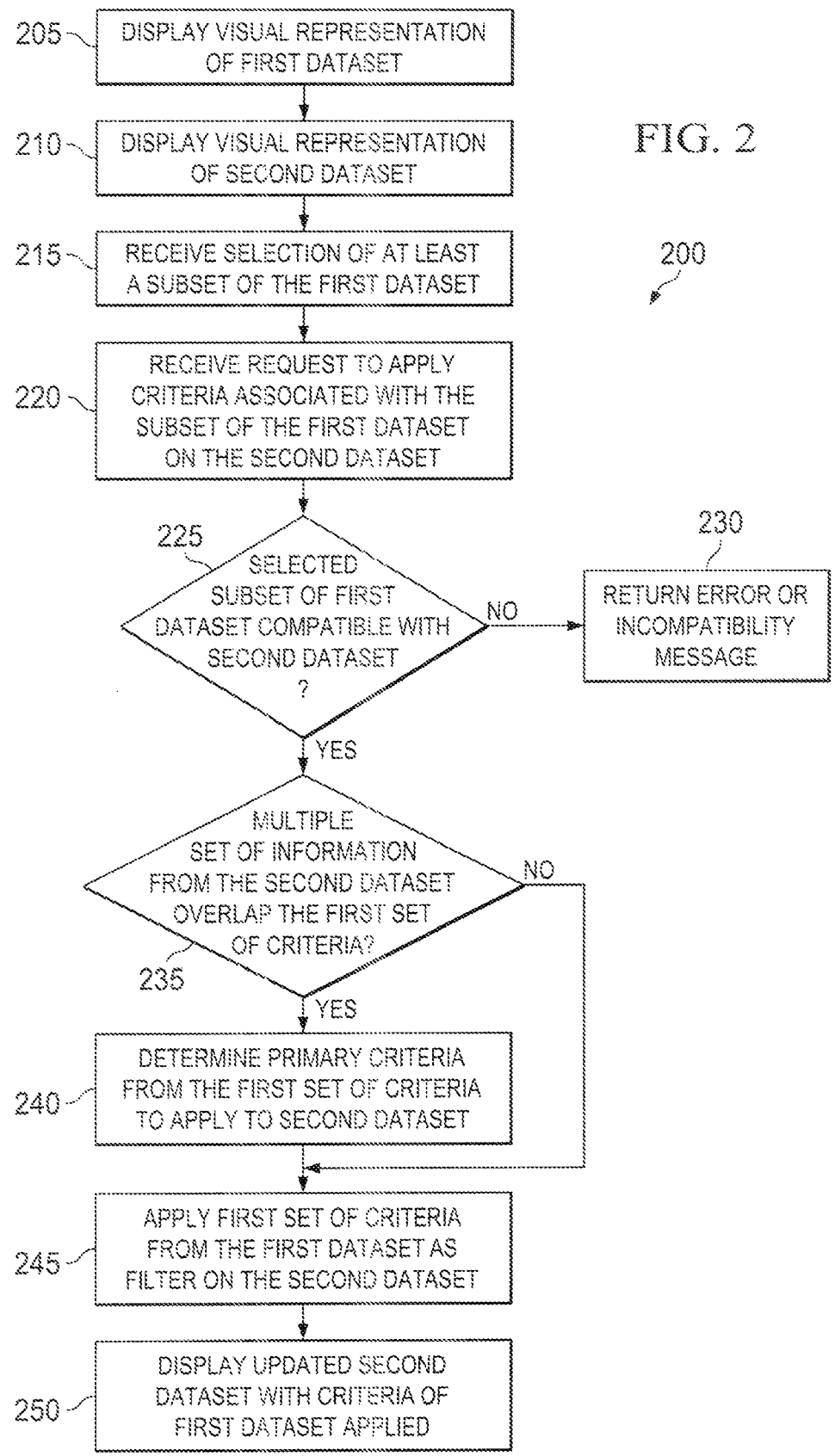
FIG. 2 is a flowchart illustrating an example method for selecting a subset of data from a first dataset and applying the criteria associated with that subset of data to a second dataset in accordance with the example environment of FIG. 1.

FIG. 2 is a flowchart illustrating one particular implementation of a method 200 for selecting a subset of data from a first dataset and applying the criteria associated with the first subset of data to a second dataset. For clarity of presentation, the description that follows generally describes method 200 in the context of environment 100 illustrated in FIG. 1. However, it will be understood that method 200 may be performed, for example, by any other suitable system, environment, or combination of systems and environments, as appropriate.

At 205, method 200 displays a visual representation of a first dataset. The first dataset may be associated with any set of appropriate data, such as business data retrieved by the business application 154 and analytical engine 158 illustrated in FIG. 1. Further, the visual representation of the first dataset can be any type of graph, chart, and/or table providing context and information regarding at least a subset of the first dataset. In some of the examples that follow, the first dataset is comprised of sales information for a business.

At 210, method 200 displays a visual representation of a second dataset. Again, the second dataset may be associated with any set of appropriate data. In many instances, the second dataset can be related to the first dataset, thereby providing a visualization of related data that can be viewed and analyzed by end users to understand current, historical, and/or projected information associated with a particular business. The second dataset may be in the same format as the first dataset, or alternatively, in a different format. For example, the visualization of the first dataset may provide a bar chart illustrating sales information from a certain yearly range, while the visualization of the second dataset may provide a pie chart illustrating the percentage of sales associated with various products for a certain time range. Additionally, the first and second datasets described herein may both be portions of the same underlying dataset, such that the first and second datasets represent distinct subsets of a single dataset. In this case, the information in both visualizations will be related, such that a common semantic understanding of the first and second datasets may be available and understandable by end users.

At 215, a selection of at least a subset of the first dataset is received. In general, the subset's selection can be received through any appropriate manner. In the environment 100 of FIG. 1, a touch or multi-touch gesture may be applied to the visualization of the first dataset (e.g., a touch and drag gesture) to select a certain subset of data. Alternatively, other input methods, such as the use of a mouse and/or hardware keyboard, may be used to define a subset of data for selection. Still further, one or more predefined filters or criteria may be selected from a list of available items displayed, for instance, on a portion of the GUI 112a for the multi-touch device 102. By selecting one of these predefined filters or criteria, a certain portion (or subset) of the visualization of the first dataset can be selected.

At 220, a request is received to apply a set of criteria associated with the selected subset of the first dataset on, or to, the second dataset. The request may be received in a number of manners, including through the reception of a touch or multi-touch gesture that comprises virtually dragging the selected subset of the first dataset onto the visual representation of the second dataset. Alternatively, one or more soft keys or buttons may be activated indicating that the selected subset should be applied to the second dataset.

At 225, method 200 determines whether the selected subset of the first dataset is compatible with the second dataset. In other words, at 225, the semantics of the selected subset (i.e., the information and filtering criteria represented by the selected subset) are compared to the information included in the visualization of the second dataset. If no overlapping of information is available, such that none of the information associated with the selected subset applies or corresponds to the second dataset, then method 200 continues at 230, where an error or incompatibility message is returned. In some instances, method 200 may simply ignore the attempted application of the selected subset to the second dataset when the information is not compatible. If, however, at least one filtering criteria or semantics associated with the selected subset is compatible with the second dataset, then method 200 continues at 235.

At 235, method 200 determines whether more than one portion of the selected subset (representing a set of filtering criteria from the first dataset) overlaps or is associated with the second dataset. For example, a subset selection from the first dataset that includes a specific sales report date range, as well as a breakdown of the regions in which products were sold, may overlap or coincide with the second dataset for both criteria. In doing so, a primary, or leading, criteria may need to be selected at 240. In some instances, a selection menu listing the two or more overlapping criteria may be presented to a user. Alternatively, one or more default priority settings may be defined so that one type of criteria is automatically selected as the primary (or leading) criteria when applied to a dataset. In some instances, and where available, both sets of criteria may be applied to the second dataset. In those instances, one criteria may be applied first, and once the first filter is applied, the second criteria is then applied. This may continue for any number of criteria or filters associated with the selected subset of the first dataset. Once a primary criteria is selected (and any additional processing performed), method 200 continues at 245.

At 245, the first set of criteria defined by or associated with the selected subset from the first dataset is applied as a filter on the second dataset. In some instances, the selected subset is reviewed, for instance, by a filter engine (e.g., filter engine 162 of FIG. 1) to determine the corresponding filters and information represented by the selected subset. Once the criteria are determined, and the overlapping fields and criteria identified in the second dataset, those criteria can then be applied to the second dataset. Once the first set of criteria is applied to the second dataset, a visual representation of the updated (or filtered) second dataset can be displayed at 250. In some instances, the updated second dataset can replace the original visualization of the second dataset, such that the visualization of the updated second dataset is displayed in the same location as the visualization of the original second dataset. Alternatively, the visualization of the updated second dataset can be displayed in a new (e.g., adjacent) area within the device's display or GUI.

Figure 5A:
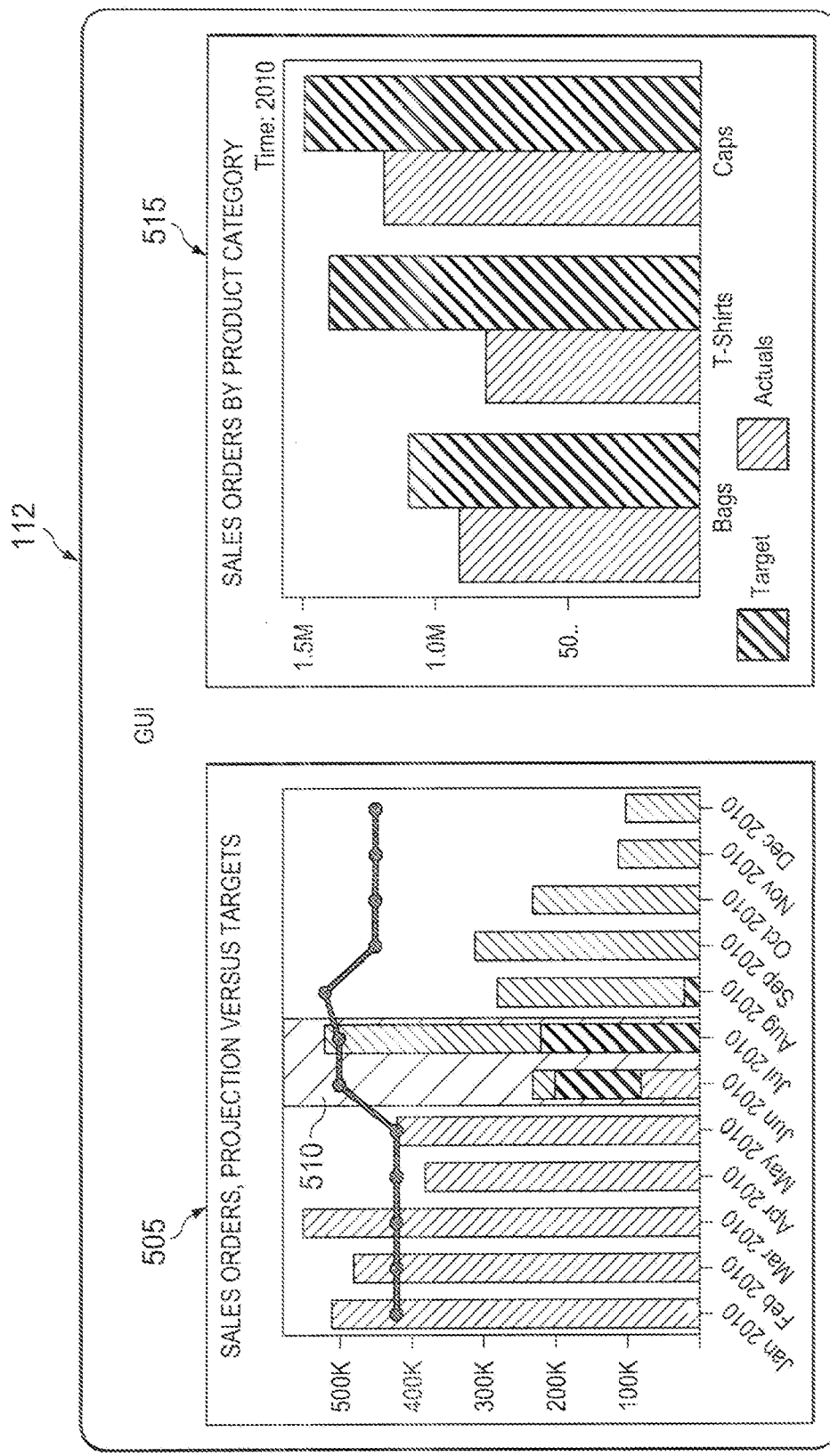
FIGS. 5A and 5B are examples of the selection and subsequent application of a filter based on a subset of data from a first dataset onto a second dataset as described by the example method of FIG. 2.
Figure 5B:
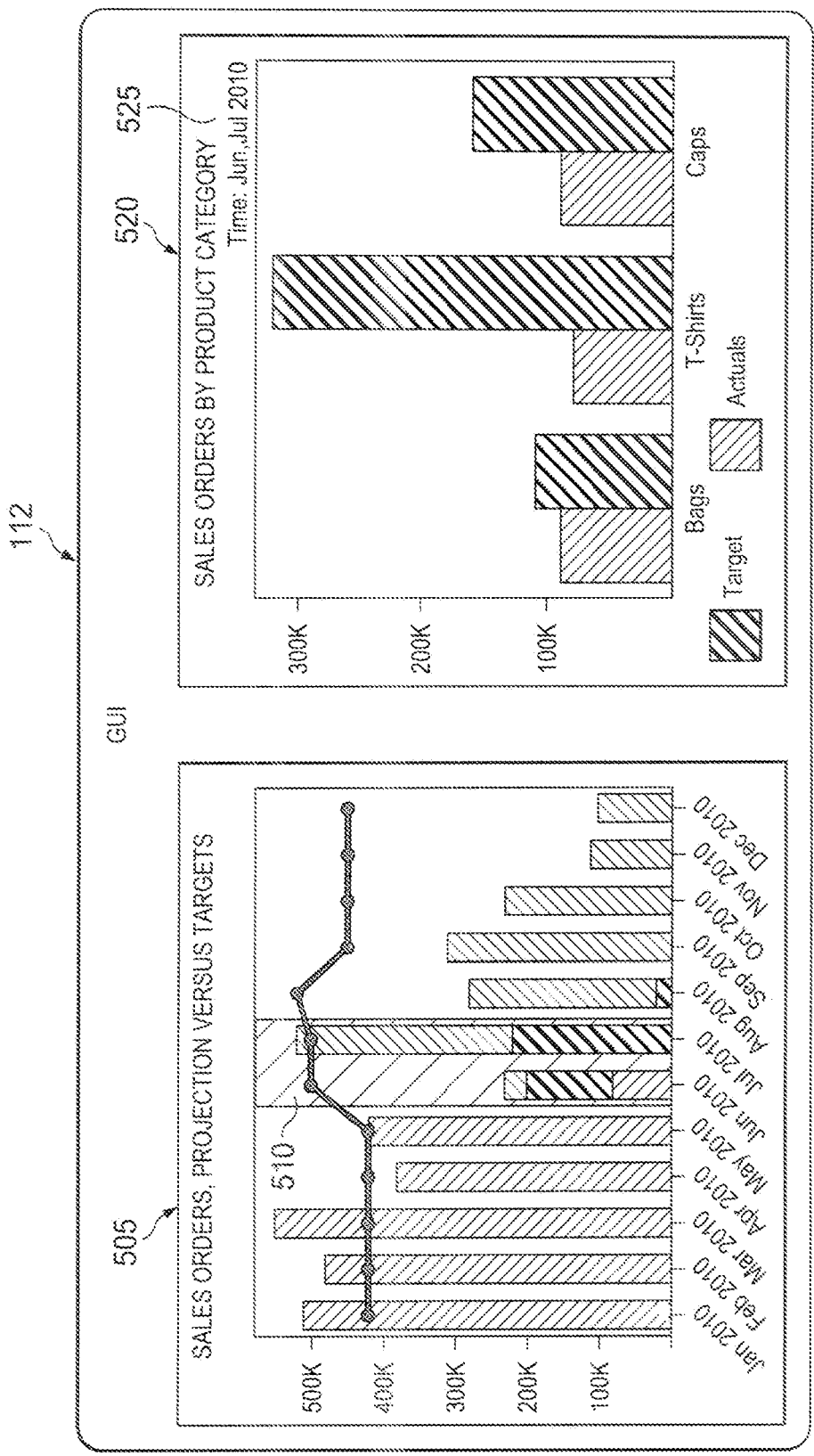

FIGS. 5A and 5B illustrate one example of the application of method 200. As illustrated, two dataset visualizations are presented in FIG. 5A—a sales order over time bar chart 505 (here including actual sales, projected sales, and targets by month from January 2010 to December 2010) and a sales orders by products category bar chart 515 (here including actual and target sales for different types of products in 2010). In this instance, the sales order over time bar chart 505 represents the visualization of a first dataset, while the sales order by product category bar chart 515 represents a visualization of a second dataset. As illustrated in FIG. 5A, a subset 510 of the first dataset has been selected by a user associated with GUI 112 and the underlying device. In some instances, the selection may have been made using touch inputs, such as dragging a finger over one portion of the visualization to indicate the beginning of the selection, to another portion of the visualization to indicate the end of the selection. For example, in this instance, the sales order information between the months of June 2010 and July 2010 have been selected by the user (as illustrated by the shaded portion 510).

FIG. 5B illustrates GUI 112 after the selected subset from FIG. 5A (subset 510) has been applied to the sales order by products category bar chart 515. In this instance, a new bar chart 520 is presented. While the new sales order by products category bar chart 520 presents similar fields and columns as the original sales order by products category bar chart 515, the filter criteria display 525 clearly indicates that the updated bar chart 520 is limited to sales orders from the period of June 2010 and July 2010, as identified in the selected subset of data from the first dataset (510 in FIG. 5A). A further example, although not illustrated herein, could be that a user could subsequently select the T-Shirts portion of the new sales order by product category bar chart 520 as a new selected subset, and apply that subset to the sales order over time bar chart 505. In doing so, the filters applied to the selected subset of data in the sales order by product category bar chart 520 (i.e., data limited to sales in June and July 2010, and T-Shirt sales only) may be applied to the sales order over time bar chart 505, such that the data from the first dataset is modified to include only T-Shirt sales information in the identified two-month span. Similar filters can be applied with multiple visualizations of datasets to allow for various manipulations and modifications to datasets and filters.

Figure 6:
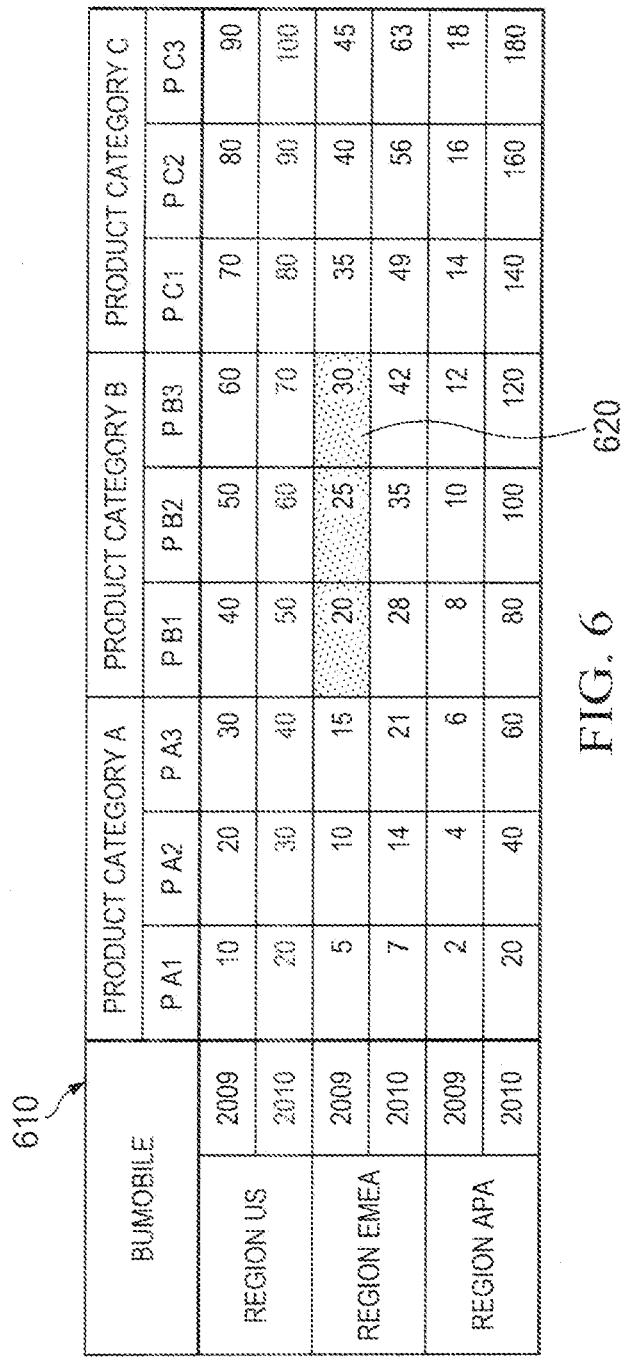
FIG. 6 illustrates an example of selecting a subset of data from a first dataset.
Figure 8A:
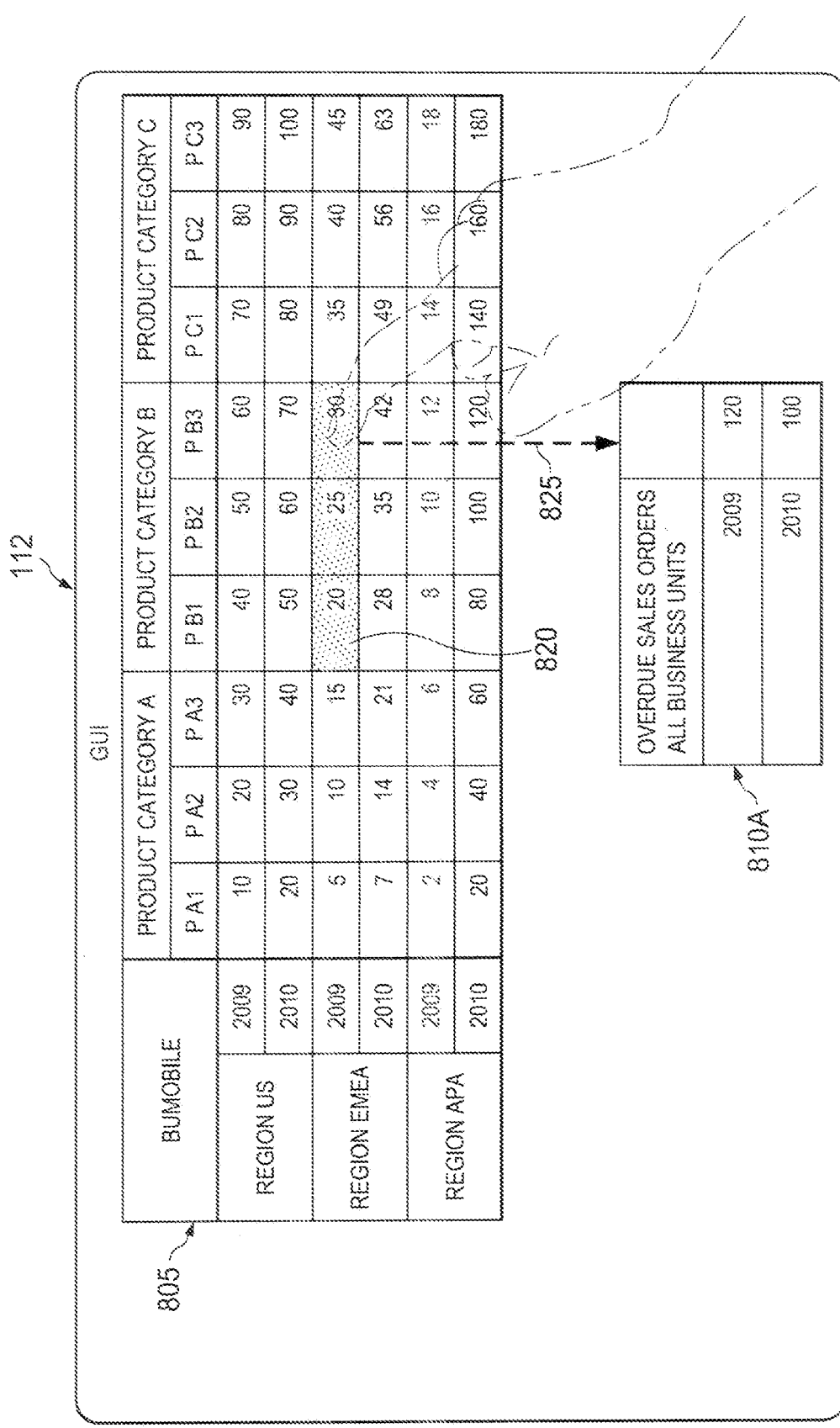
FIGS. 8A and 8B are examples of the selection and subsequent application of a filter based on a subset of data from a first dataset onto a second dataset as described by the example method of FIG. 2.
Figure 8B:
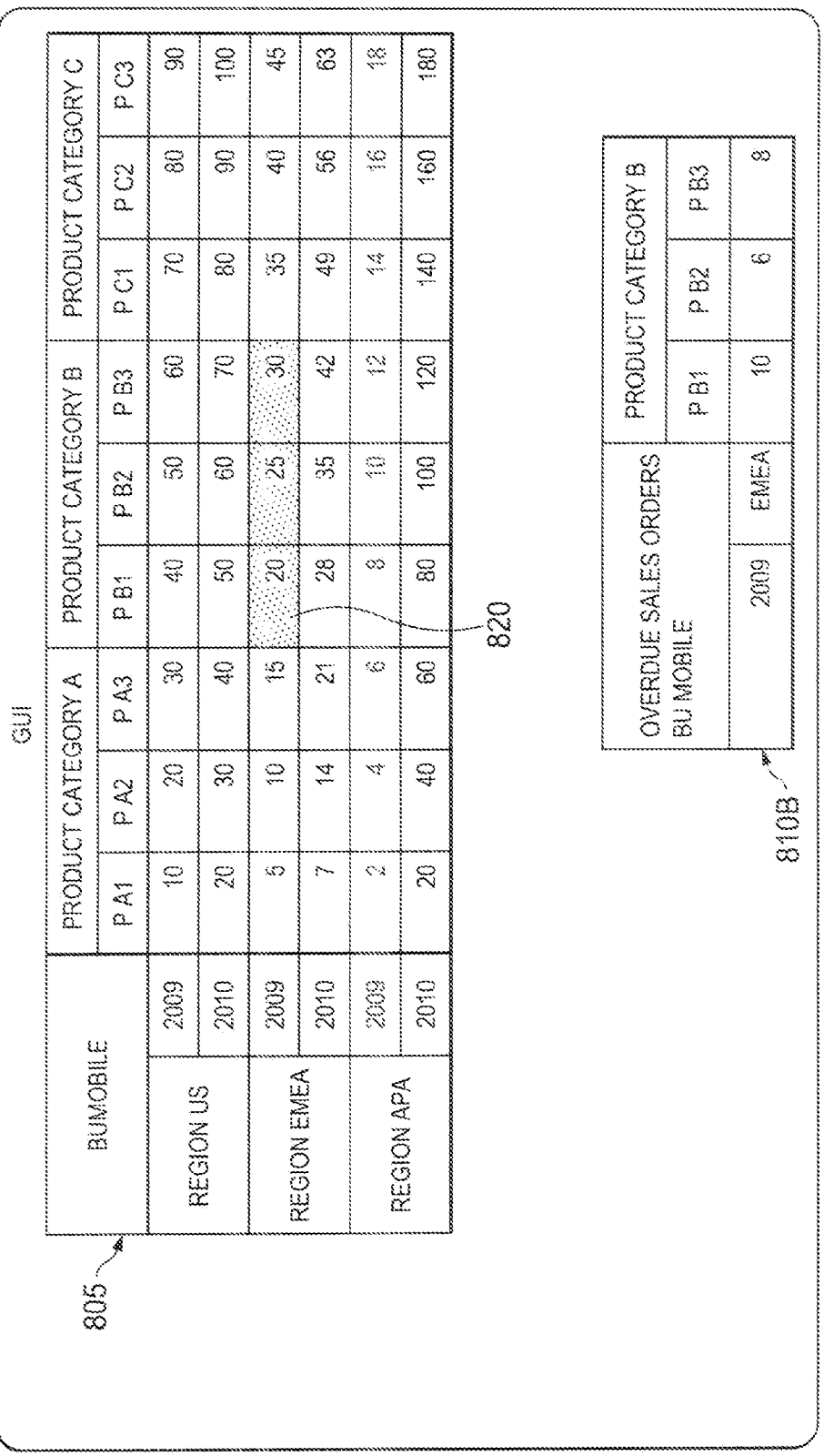

FIG. 6 illustrates an example of selecting a subset of data from a first dataset, and FIGS. 8A and 8B illustrate examples of applying method 200 to tables (instead of the charts as illustrated in FIGS. 5A and 5B). FIG. 6 represents a set of data with information in the x-axis of the table, as well as the y-axis of the table. The table 610 illustrates sales volume for a specific business unit—here, mobile phones. Additionally, sales in particular regions for the respective years are illustrated in the rows, with overall product category and specific products provided in the columns. As illustrated in FIG. 6, a subset of the dataset has been selected (as shown by the highlighted portion labeled 620). The selection of these specific table cells, which may be received by touch or multi-touch input, applies to criteria which are part of the selection, namely, the entire Product Category B for Region EMEA (Europe, Middle East, and Asia) in the year 2009. As described above, the semantics associated with the selected subset can be used to determine the filter and information associated with the selection.

FIGS. 8A and 8B illustrate an example of using the selection from FIG. 6, and applying the criteria to a second dataset. In illustrated FIG. 8A, the same set of information 820 from FIG. 6 (i.e., the entire Product Category B for Region EMEA in the year 2009) is selected from the first dataset 805 representing sales in the mobile phone business unit. A second dataset 810A, named Overdue Sales Orders—All Business Units, includes information on overdue sales orders for all business units in 2009 and 2010. The GUI 112 illustrated in FIG. 8A is part of a touch-enabled and/or multi-touch device, and allows users to input various gestures corresponding to one or more operations and commands. In the illustrated example, the selected subset 820 is selected using a touch gesture, and dragged (825) onto the second dataset 810A. By manipulating the visual representation of the selected subset 820 of the first dataset 805 onto the second dataset 810A, method 200 allows the criteria identified and/or corresponding to the selected subset 820 to be applied to the second dataset 810A as a filter. FIG. 8B illustrates the results, showing the newly filtered dataset 810B, now filtered by Product Category B for Region EMEA in the year 2009. As illustrated in FIG. 8B, the newly filtered dataset 810B replaces the previous representation of the second dataset 810A from FIG. 8A, although in some instances, the second dataset 810A may remain, and the newly filtered dataset 810B may be displayed in a third area of the GUI 112.

Figure 3:
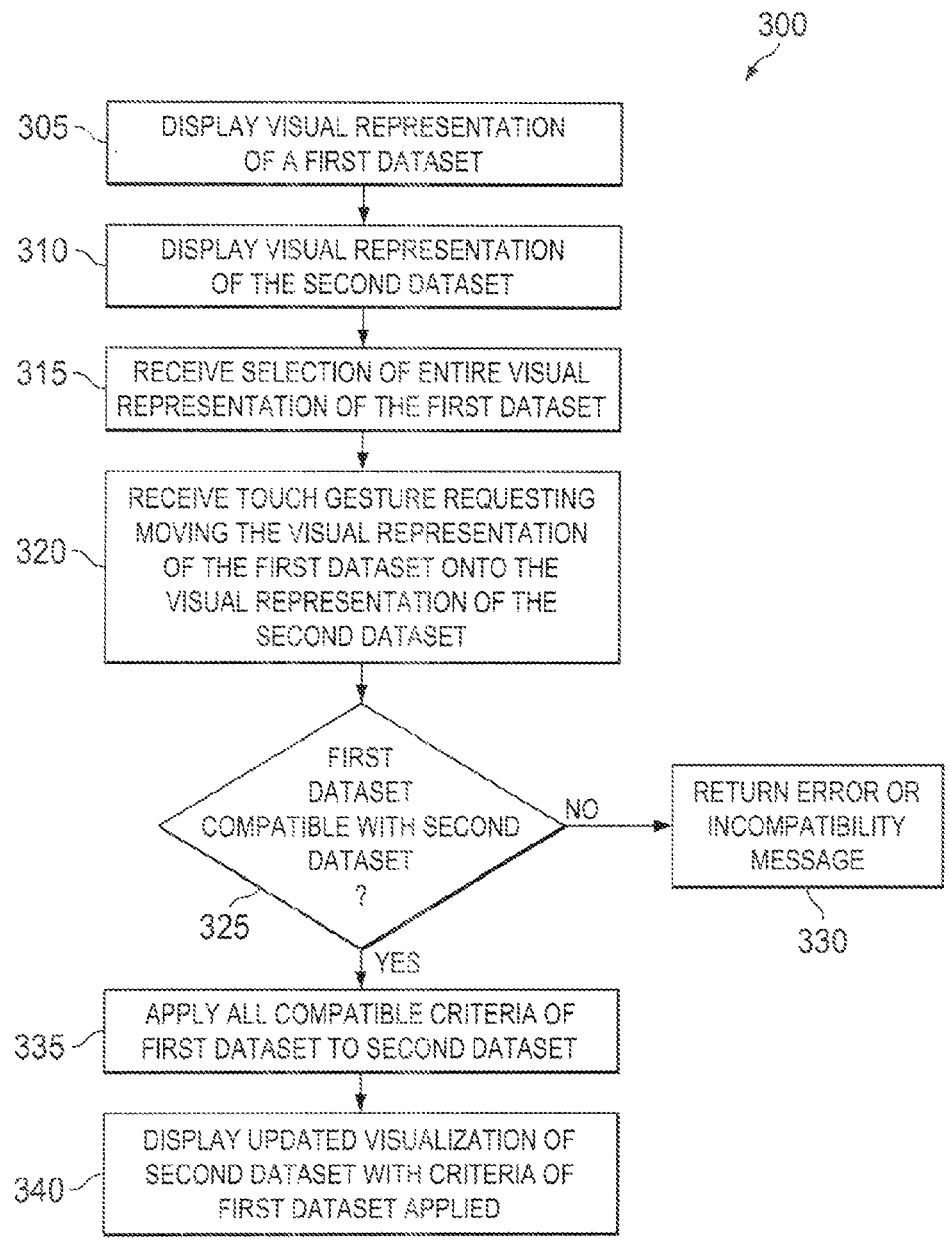
FIG. 3 is a flowchart illustrating an example method for selecting an entire first dataset and applying the criteria associated with the first dataset to a second dataset in accordance with the example environment of FIG. 1.

FIG. 3 is a flowchart illustrating an example method 300 for applying a set of criteria associated with an entire first dataset to a second dataset. For clarity of presentation, the description that follows generally describes method 200 in the context of environment 100 illustrated in FIG. 1. However, it will be understood that method 200 may be performed, for example, by any other suitable system, environment, or combination of systems and environments, as appropriate.

At 305, a visual representation of a first dataset is displayed. Similar to method 200, the first dataset may be associated with any set of data, including business data retrieved from or associated with the business application 154, derived by the analytical engine 158, and/or retrieved from one or more of the external data sources 170 of FIG. 1. Similarly, the first dataset may be visualized as any type of graph, chart, table, or other visualization as determined by inputs from a user or by default values determined by the associated application 114 or business application 154 (as well as any other associated application or operations).

At 310, method 300 displays a visual representation of a second dataset. As described in association with method 200, the second dataset may be associated with any set of appropriate data, and, in many instances, can represent information related to the first dataset. The second dataset may be in the same format as the first dataset, or alternatively, in a different format. For example, the visualization of the first dataset may provide a bar chart illustrating sales information from a certain yearly range, while the visualization of the second dataset may provide a pie chart illustrating the percentage of sales associated with various products for a certain time range. In some instances, the same datasets described in method 200 can be used for method 300 of FIG. 3.

At 315, method 300 receives the selection of the entire visualization of the first dataset. Any number of methods or operations for selecting the entire dataset may be used, including a "circle" gesture enclosing the entirety of the first dataset's visualization, as well as a double-tap gesture on a corner or designated portion of the visualization. Any suitable touch, multi-touch, or traditional input (e.g., commands entered using a mouse or keyboard) may be used to select the entirety of the first dataset.

Once selected, a touch gesture requesting, or indicating, the movement of the visualization of the selected first dataset onto the visual representation of the second dataset is received at 320. In some instances, once the entire first dataset is selected, a dragging touch motion may be used to apply the first dataset criteria onto the second dataset. Alternatively, one or more soft keys may be used to instruct the first dataset to be applied to the second dataset. Any other suitable method of instructing the application of the first dataset to the second dataset can be used.

At 325, method 300 determines whether the first dataset is compatible with the second dataset. In other words, whether the underlying data associated with the first dataset includes at least a portion of overlapping or consistent information that can be used as filter criteria when applied to the second dataset. If it is determined that the first dataset is not compatible with the second dataset, method 300 continues at 330, where an error or incompatibility message may be returned to the user or device. In other instances, the attempted application of the first dataset to the second dataset can be ignored, or otherwise denied. If, however, the first dataset is compatible with the second dataset, method 300 continues at 335.

At 335, all compatible criteria associated with the first dataset are applied to the second dataset, including any preset parameters and/or selected criteria of the first dataset. Specifically, the receiving second dataset is modified according to the filter representation of the selected data source (i.e., the first dataset). Filters already applied to the second dataset prior to the application of the first dataset's filter criteria are generally left applied to the second dataset. In some instances, overlapping or inconsistent filters may be handled based on the default settings of the underlying application or filter engine. In some instances, the selected source's filters may be applied to the second dataset, while in other instances, the second dataset's original filters may override any attempted changes by the first dataset's associated criteria.

Once the second dataset is updated according to the filters of the first dataset, at 340 method 300 displays an updated visualization of the second dataset using the filter criteria applied by the first dataset. In some instances, the updated second dataset can replace the original visualization of the second dataset, such that the visualization of the updated second dataset is displayed in the same location as the visualization of the original second dataset. Alternatively, the visualization of the updated second dataset can be displayed in a new or nearby area within the device's presenting GUI.

Figure 7A:
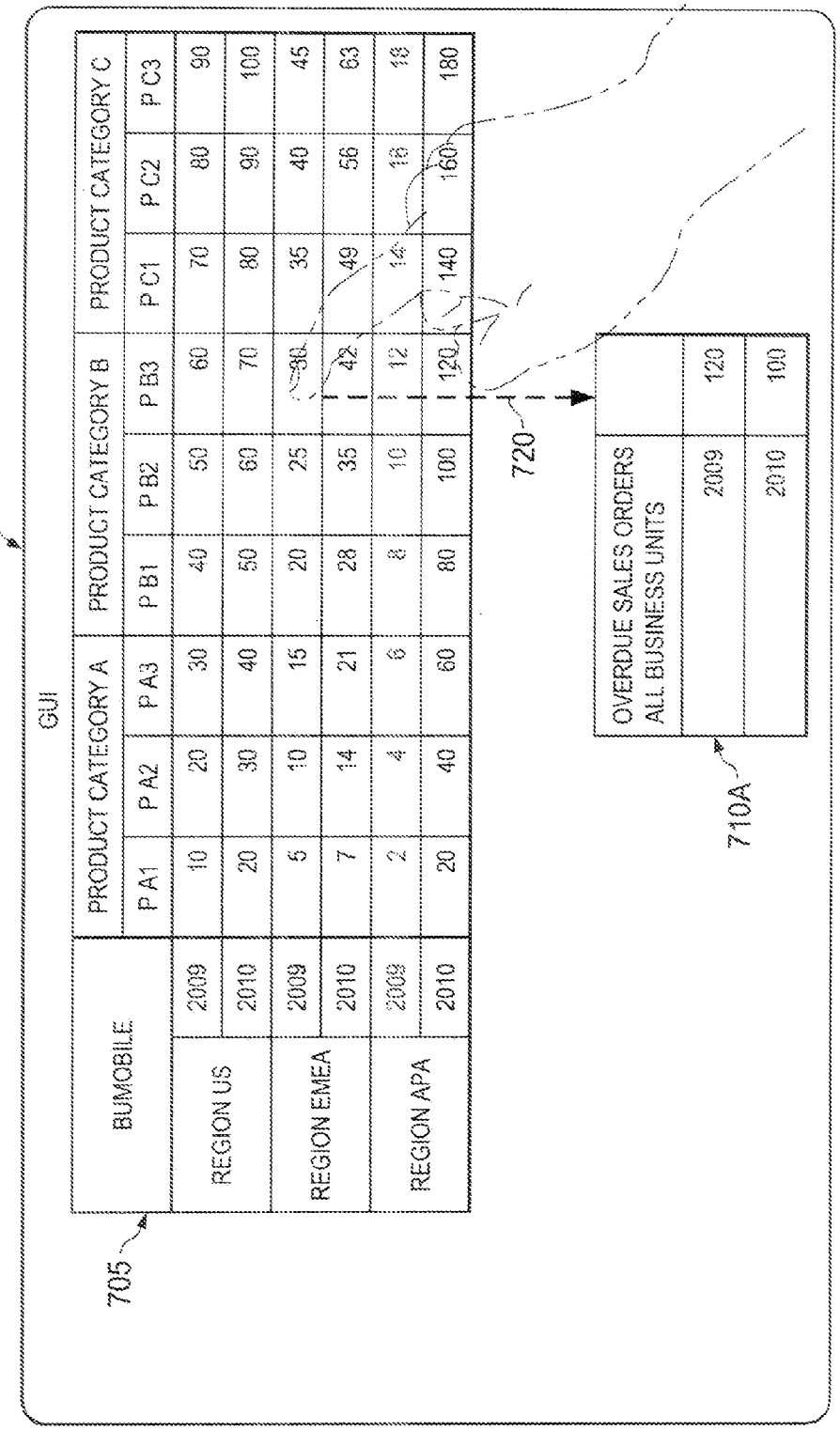

FIGS. 7A and 7B illustrate an example of the application of an entire first dataset onto a second dataset through interactions with the corresponding visualizations of the two datasets. As illustrated in FIG. 7A, the first dataset 705, information on the sales value for a mobile phone business unit, is visually represented as a table, with rows defining sales in particular regions and by specific years, and the columns providing information on overall product categories and specific products within those categories. The second visualized dataset 710A represents information on overdue sales orders for all business units in the years 2009 and 2010. As illustrated by the gesture element 720, the entirety of the visualization of the first dataset 705 is selected in the GUI 112 and dragged (or otherwise requested to be applied to) onto the second dataset 710A. FIG. 7B illustrates the result of this action. Specifically, when the entire table illustrating the first dataset 705, representing the mobile phone business unit's sales for all product categories and products for all regions in all years, is applied to the original second dataset 710A, representing the overdue sales orders for all business units, the resulting updated second dataset 710B comprises overdue sales orders for the mobile phone business unit. In other words, the first dataset's primary criteria was the limitation to the mobile phone business unit. By applying the first dataset's criteria to the overdue sales orders for all business units, the first dataset's filter criteria of the mobile business unit (as opposed to all business units) is applied to the second dataset, and is reflected in the updated second dataset 710B illustrated in FIG. 7B.

Figure 4:
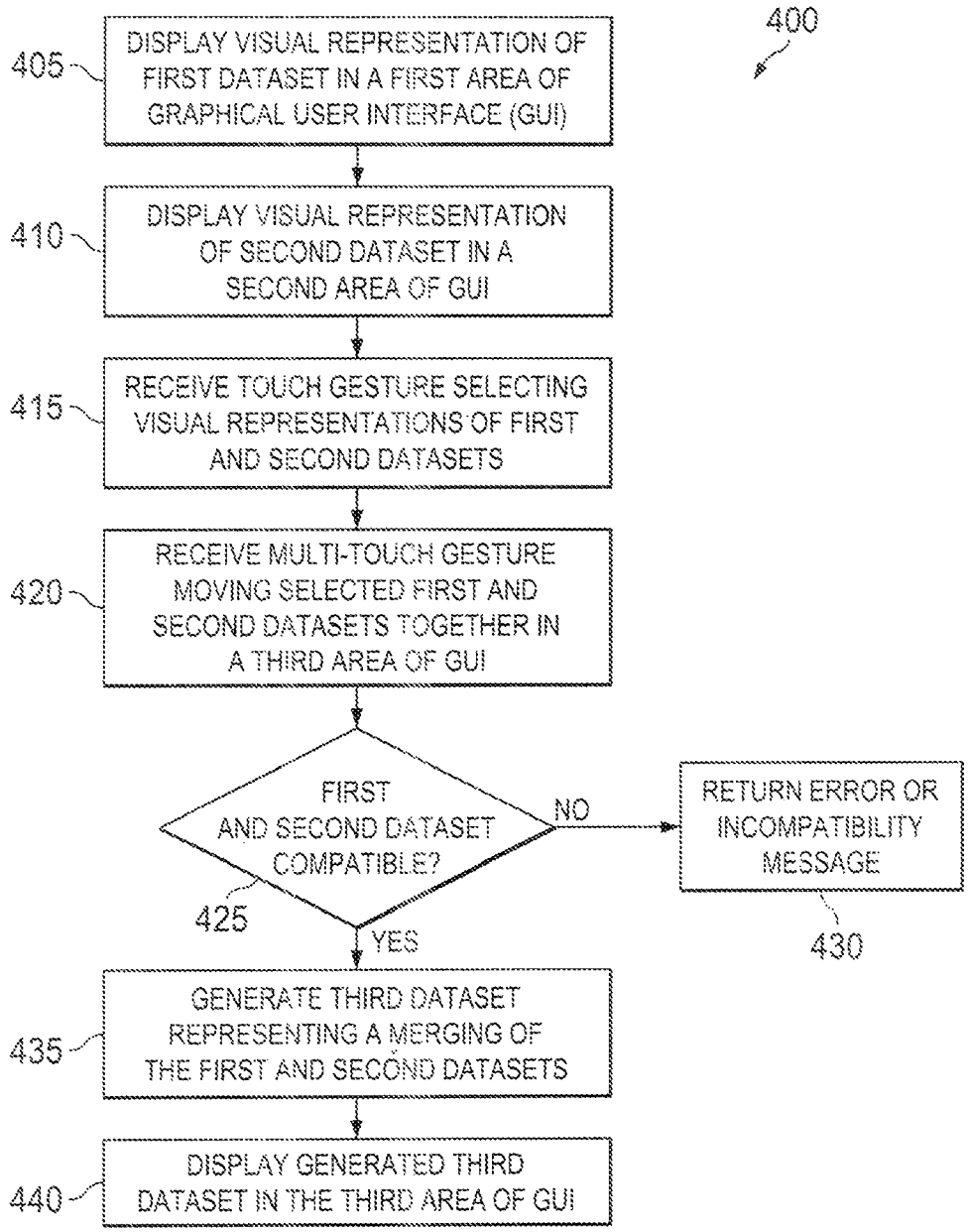
FIG. 4 is a flowchart illustrating an example method for merging a first and a second dataset in response to one or more touch gestures received from a user in accordance with the example environment of FIG. 1.

FIG. 4 is a flowchart illustrating an example method 400 for merging visualizations of a first and a second dataset (in first and second locations within a GUI) in response to corresponding touch gestures, and generating a visualization of a third dataset (in a third location within the GUI) in response to a request to merge the visualizations. For clarity of presentation, the description that follows generally describes method 400 in the context of environment 100 illustrated in FIG. 1. However, it will be understood that method 400 may be performed, for example, by any other suitable system, environment, or combination of systems and environments, as appropriate.

At 405, a visual representation of a first dataset is displayed in a first area of a GUI. The first dataset may be any suitable data or information, similar to the datasets described in connection with the previous figures. At 410, a visual representation of a second dataset is displayed in a second area of the GUI. Again, the second dataset may be any suitable data or information as described above. In some instances, the first and second areas in which the respective visual representations are displayed may be defined by a user interacting with a device, or, alternatively, in areas predefined by an underlying application for the presentation and display of datasets. Further, the areas may be configurable at runtime, such that users and applications can modify the areas in which the visual representations are displayed. In one instance, touch and/or multi-touch gestures may be used via a touch screen associated with the GUI to move either or both of the visualizations of the first and second datasets from one area or location to another. In some instances, the location of the respective visual representations may be modified based on the orientation of the associated device, as well as by inputs received from the user.

At 415, touch gestures corresponding to the selection of the visual representations of the first and second datasets may be received (i.e., via touch or multi-touch inputs applied via the touch screen). In some instances, the two visual representations may be simultaneously touched by two fingers in a multi-touch gesture. In another instance, the two visual representations may be touched in sequence resulting in their subsequent selection. At 420, a multi-touch gesture (or another command or suitable input) is received that moves the visual representations of the first and second dataset (or alternatively, copies or images of the visual representations) together in a third area of the GUI. For instance, a dragging gesture, or simultaneously touching each of the two visual representations and subsequently moving the visualizations (while continuing to touch the respective visualizations) to a common, third location on the GUI, may be used to request the combination of the two datasets.

At 425, method 400 determines whether the first and second datasets are compatible, such that a combination of the two sets of information is semantically possible. If the first and second datasets are not compatible, then method 400 continues at 430 where an error or incompatibility message is returned or displayed. In other implementations, the attempted combination of the two datasets may instead be ignored, or cancelled, if the two datasets are not compatible. If, however, method 400 determines that the datasets are compatible, method 400 continues at 435.

At 435, a third dataset comprising a merger of the first and second datasets is generated. In some instances, the leading, or primary, characteristic of the two datasets may be selected before the third dataset (or a visualization thereof) can be displayed. For instance, a graph illustrating sales by region and a graph illustrating sales by product may be merged using method 400. When those graphs are combined, a determination may need to be made as to whether the leading, or primary, characteristic of the graph will be the product or the region for the third dataset. The generation and visualization of the third dataset may be formatted or displayed differently depending on the leading characteristic of the graph. In general, the choices for leading characteristics may be the filters (and, in some cases, the overlapping filters) applied on the first and second datasets prior to their combination. Once the third dataset is generated based on the combination, the generated third dataset is displayed in a third area of the GUI at 440. In most instances, the visualizations of the first and second datasets can remain in their respective locations after method 400 has been performed, in effect generating a new dataset, while leaving the first and second datasets intact as originally visualized.

Figure 9A:
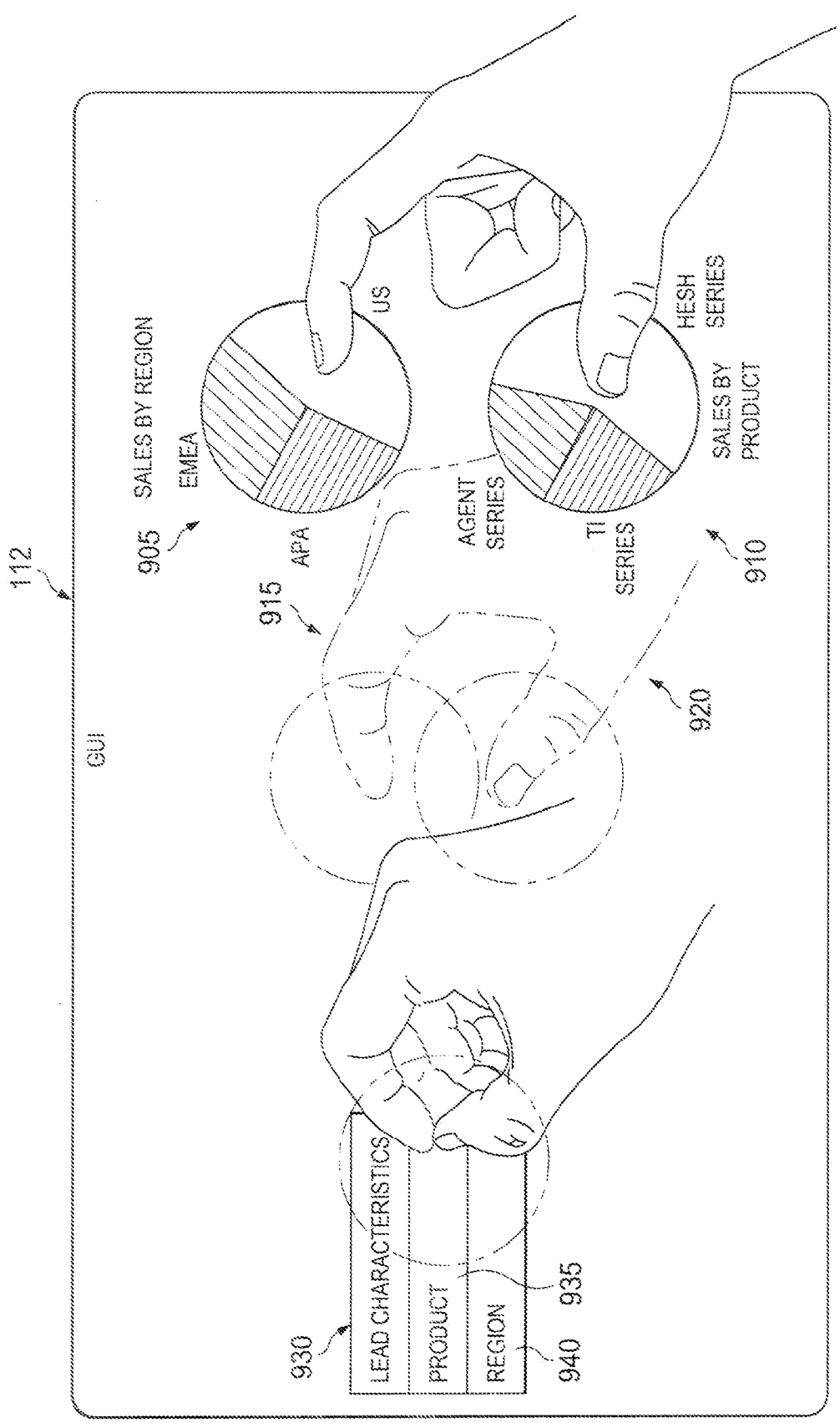
FIGS. 9A and 9B are examples of the merging of a first and a second dataset to generate a third dataset as described by the example method of FIG. 4.
Figure 9B:
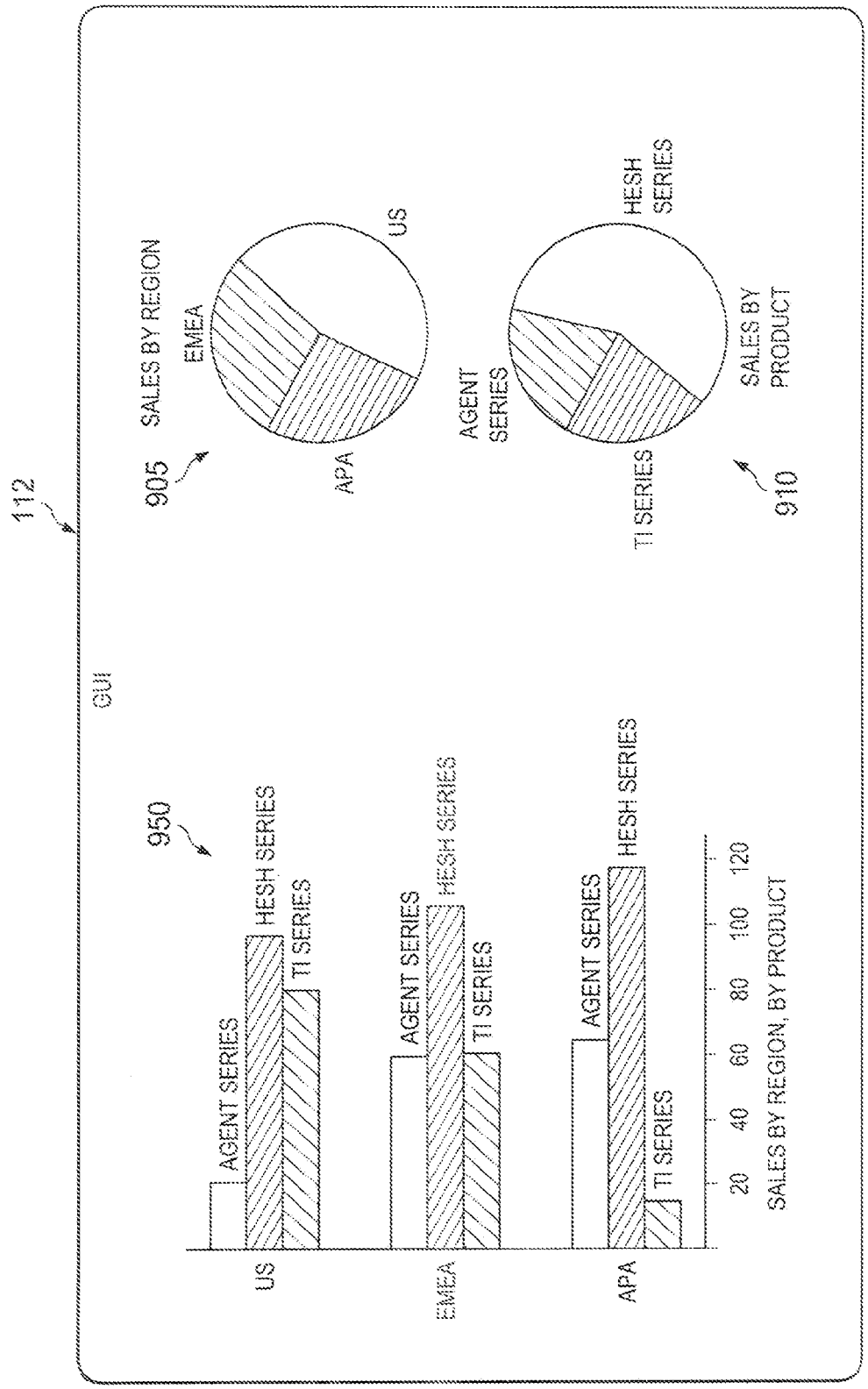

FIGS. 9A and 9B are examples of the merging of a first and a second dataset to generate a third dataset as described by the example method of FIG. 4. As illustrated in FIG. 9A, two pie charts—a sales by region pie chart 905 and a sales by product pie chart 910 are presented in a first and second location within GUI 112. The sales by region pie chart 905 is separated into sales in three regions: APA, EMEA, and US. The sales by product pie chart 910 is separated into sales of three products: TI Series, Agent Series, and Hesh Series. As illustrated by multi-touch gesture 915 and 920 (representing a selection and subsequent and simultaneous dragging of the two pie charts together), the two pie charts are requested to be merged into a single chart. When the request is made, however, the underlying application provides a Lead Characteristic selection interface 930, which provides the user with the option of using either the product 935 (the filter criteria of pie chart 905) or the region 940 (the filter criteria of pie chart 910) as the leading characteristic for the to-be-generated third dataset (and corresponding visualization).

FIG. 9B shows GUI 112 after the user has selected the region (940 of FIG. 9A) as the leading characteristic of the newly generated third dataset. New bar chart 950 provides the visual representation of the newly generated third dataset combining sales by region and sales by product, with sales by region providing the leading characteristic (as shown by the region information located on the y-axis of the bar chart 950). Further, the new bar chart 950 is generated in the same area or location at which the visualizations of the first and second datasets were combined, as illustrated in FIG. 9A. Thus, merging these two datasets allows the original two datasets to remain and a new visual representation of the dataset to be created. As illustrated, the manipulation (or movement) of the two original datasets together allows for the generation of the third dataset and corresponding visualization.

Although this disclosure has been described in terms of certain implementations and generally associated methods, alterations and permutations of these implementations and methods will be apparent to those skilled in the art. For example, the actions described herein can be performed in a different order than as described and still achieve desirable results. As one example, the processes depicted in the accompanying figures do not necessarily require the particular order shown, or sequential order, to achieve the desired results. In certain implementations, multitasking and parallel processing may be advantageous. Further, the present disclosure is generally described as including visualizations of a first and second dataset, although any number of visualizations of datasets can be used in a particular implementation. For instance, three, four, or five (or any other number of) datasets may be present and displayed simultaneously in some instances. Two or more of the datasets can be combined to create various types of dataset filters and updated visualizations of data by extending the methods and operations described herein. Still further, multiple operations, such as those described by methods 200, 300, and 400 (of FIGS. 2, 3, and 4) can be combined or sequentially performed to generate multiple instances and visualizations of various datasets. Other variations are within the scope of the following claims.

What is claimed is:

1. A method for performing analytical procedures by interactions with visual representations of datasets, comprising:
    displaying a visualization of a first filtered dataset in a first portion of a graphical user interface (GUI), the visualization of the first filtered dataset associated with at least a first set of filters applied to an underlying dataset;
    displaying a visualization of a second filtered dataset in a second portion of the GUI, the second filtered dataset associated with at least a second set of filters applied to the underlying dataset, the second set of filters being different from the first set of filters;
    receiving a selection of at least a portion of the data from the visualization of the first filtered dataset, the selection associated with a set of criteria representing a subset of the first set of filters;
    receiving a request to apply the selection associated with the set of criteria to the second filtered dataset;
    based on the received request, determining whether at least a portion of the set of criteria is compatible with the second filtered dataset, wherein at least a portion of the set of criteria is compatible with the second filtered dataset when at least a portion of the set of criteria can be applied to the second filtered dataset;
    in response to determining that the at least a portion of the set of criteria is compatible with the second filtered dataset, applying the compatible portion of the set of criteria to the second filtered dataset to generate a third filtered dataset, the third filtered dataset representing the second filtered dataset associated with a combination of the second set of filters and the compatible portion of the set of criteria ; and
    displaying a visual representation of the third filtered dataset in the GUI.

2. The method of claim 1, wherein the visual representation of the third filtered dataset is displayed in a third portion of the GUI.

3. The method of claim 1, wherein the visual representation of the third filtered dataset is displayed in the second portion of the GUI.

4. The method of claim 1, wherein the visual representations of the first, second, and third filtered datasets comprise graphical objects.

5. The method of claim 4, wherein the graphical objects include at least one of the following: a bar chart, a line graph, a pie chart, and a table.

6. The method of claim 1, wherein the GUI is presented on a touch screen input/output display, and further wherein receiving the selection of at least a portion of the data from the visualization of the first filtered dataset further comprises receiving a touch gesture via the touch screen identifying at least a portion of the visualization of the first filtered dataset.

7. The method of claim 6, wherein receiving a request to apply the selection associated with the set of criteria to the second filtered dataset comprises receiving a touch gesture dragging the selection associated with the set of criteria from the first filtered dataset over the visualization of the second filtered dataset.

8. The method of claim 1, wherein the selection of the at least a portion of the data from the visualization of the first filtered dataset comprises the entire visualization of the first filtered dataset.

9. A method for performing analytical procedures by interactions with visual representations of datasets, comprising:
    displaying a visualization of a first dataset in a first portion of a graphical user interface (GUI), the visualization of the first dataset associated with at least a first set of filters applied to a dataset;
    displaying a visualization of a second dataset in a second portion of the GUI, the visualization of the second dataset associated with at least a second set of filters applied to the dataset, the second set of filters being different from the first set of filters;
    receiving, via a multi-touch gesture, a request to combine the first and second datasets, the request associated with a third portion of the GUI;
    determining, after receiving the request to combine the first and second datasets, whether the first set of filters and the second set of filters are compatible for merging;
    after determining the first and second datasets are compatible for merging, generating a third dataset representing a merging operation of the first and second sets of filters, wherein the third dataset comprises a subset of the dataset filtered by a combination of at least the first and second sets of filters; and displaying a visualization of the third dataset in a third portion of the GUI.

10. The method of claim 9, wherein the multi-touch gesture comprises a simultaneous touch dragging of the visualization of the first dataset and the visualization of the second dataset to a location within the third portion of the GUI.

11. The method of claim 9, wherein the first dataset and the second dataset are derived from a common dataset.

12. The method of claim 9, wherein the visual representations of the first, second, and third datasets comprise graphical objects.

13. The method of claim 12, wherein the graphical objects include at least one of the following: a bar chart, a line graph, a pie chart, and a table.

14. The method of claim 12, wherein the visual representations of the first and second datasets comprise a first type of graphical object, and wherein the visual representation of the third dataset comprises a third type of graphical object.

15. The method of claim 9, wherein generating the third dataset representing a merging operation of the first and second sets of filters further comprises:

identifying at least one filter from the first set of filters and at least one filter from the second set of filters as possible leading filters for the visualization of the third dataset;

presenting, via the GUI, the at least one filter from the first set of filters and the at least one filter from the second set of filters for selection; and in response to receiving, via the GUI, a selection of a particular filter from the at least one filter from the first set of filters and the at least one filter from the second set of filters, applying the selected filter as the leading filter for the visualization of the third dataset.

16. A non-transitory, computer-readable medium storing computer-readable instructions executable by a computer and configured to:

display a visualization of a first filtered dataset in a first portion of a graphical user interface (GUI), the visualization of the first filtered dataset associated with at least a first set of filters applied to an underlying dataset;

display a visualization of a second filtered dataset in a second portion of the GUI, the second filtered dataset associated with at least a second set of filters applied to the underlying dataset, the second set of filters being different from the first set of filters;

receive a selection of at least a portion of the data from the visualization of the first filtered dataset, the selection associated with a set of criteria representing a subset of the first set of filters;

receive a request to apply the selection associated with the set of criteria to the second filtered dataset;

based on the received request, determine whether at least a portion of the set of criteria is compatible with the second filtered dataset, wherein at least a portion of the set of criteria is compatible with the second filtered dataset when at least a portion of the set of criteria can be applied to the second filtered dataset;

upon determining that the at least a portion of the set of criteria is compatible with the second filtered dataset, applying the compatible portion of the set of criteria to the second filtered dataset to generate a third filtered dataset, the third filtered dataset representing the second filtered dataset associated with a combination of the second set of filters and the compatible portion of the selected set of criteria ; and display a visual representation of the third filtered dataset in the GUI.

17. The medium of claim 16, wherein the visual representation of the third filtered dataset is displayed in a third portion of the GUI.

* * * * *